United States Patent
Mitchell et al.

(10) Patent No.: US 7,359,123 B1
(45) Date of Patent: Apr. 15, 2008

(54) OPTICAL FIELD FLATTENERS AND CONVERTERS

(75) Inventors: Thomas A. Mitchell, Nazareth, PA (US); Thomas W. Stone, Hellertown, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 0 days.

(21) Appl. No.: 11/407,764

(22) Filed: Apr. 20, 2006

Related U.S. Application Data

(60) Provisional application No. 60/673,585, filed on Apr. 21, 2005.

(51) Int. Cl.
   *G02B 3/00* (2006.01)
   *G02B 9/00* (2006.01)

(52) U.S. Cl. .................. 359/654; 359/652; 359/653

(58) Field of Classification Search ................ 359/648, 359/652, 653, 654; 358/115, 116; 385/120
See application file for complete search history.

(56) References Cited

U.S. PATENT DOCUMENTS

| | | | | |
|---|---|---|---|---|
| 3,033,071 A | * | 5/1962 | Hicks | 385/116 |
| 3,265,926 A | * | 8/1966 | Schlesinger | 315/16 |
| 3,677,621 A | * | 7/1972 | Smith | 359/487 |
| 3,936,841 A | * | 2/1976 | Tiefenthal | 396/554 |
| 4,331,380 A | * | 5/1982 | Rees et al. | 385/116 |
| 4,447,126 A | | 5/1984 | Heidrich et al. | 350/96.31 |
| 4,852,982 A | | 8/1989 | Yamamoto et al. | 350/413 |
| 5,125,064 A | * | 6/1992 | Naselli et al. | 385/116 |

FOREIGN PATENT DOCUMENTS

| EP | 0316507 B1 | 12/1993 |
|---|---|---|
| JP | 25338341 A | 12/2005 |

OTHER PUBLICATIONS

U.S. Appl. No. 60/673,585, filed Apr. 21, 2005. Thomas A. Mitchell et al. Optical Field Flatteners and Converters.
U.S. Appl. No. 11/251,401, filed Oct. 14, 2005. Optical Field Flatteners. Applicant: Thomas W. Stone.

* cited by examiner

*Primary Examiner*—David N. Spector
(74) *Attorney, Agent, or Firm*—Burns & Levinson LLP; Jacob N. Erlich; Orlando Lopez

(57) ABSTRACT

Optical field flattener and converter having an array of gradient index rod lenses. Each gradient index rod lens is substantially in proximity with at )east one other gradient index rod lens. The array is capable of receiving electromagnetic radiation and imaging the received electromagnetic radiation.

30 Claims, 7 Drawing Sheets

OPTICAL FIELD FLATTENERS AND CONVERTERS

CROSS REFERENCE TO RELATED APPLICATIONS

This application claims priority of U.S. Provisional Application 60/673,585 entitled "OPTICAL FIELD FLATTENERS AND CONVERTERS," filed on Apr. 21, 2005, which is incorporated by reference herein.

STATEMENT REGARDING FEDERALLY SPONSORED RESEARCH OR DEVELOPMENT

This invention was made partially with U.S. Government support from the Air Force Research Lab under Contract No. F33615-99-C-1410. The U.S. Government has certain rights in the invention.

BACKGROUND OF THE INVENTION

This invention relates generally to optical field flatteners and converters.

A field flattener or field converter is a known device that is commonly used to flatten or modify the field curvature of an optical system, wherein the term "field converter" refers to the general case of modifying one general curve to another and the term "field flattener" refers to the special case of converting a general curve to a plane. Optical imaging elements, including but not limited to lenses, mirrors, and diffraction gratings, typically introduce a degree of field curvature into an optical system, sometimes referred to as the Petzval curvature. The presence of this optical aberration causes the focus as a function of spatial field position to deviate from a common plane, typically in a predominantly spherical or aspherical fashion. Applicable detecting arrays, including CCDs and Multiple Quantum Well (MQW) structures, however, are for the most part constrained to planar geometries due to the inherent lithographic and epitaxial fabrication technologies. This mismatch between the image locus of optical systems aberration by field curvature and these planar detector arrays results in image degradation as a function of spatial field, particularly for large fields.

The classic approach to compensating for this fundamental mismatch is to make use of refractive solutions in lens design, chiefly the technique originating in 1872 with C. Piazzi-Smyth in which a negative field lens is placed adjacent to the image plane and is well known in the art. When a lens is placed near a focal plane it makes little contribution to the optical power, but can have a pronounced effect on the field curvature. This Piazzi-Smyth field flattener is a standard tool used in reducing the mismatch between curved image planes and planar detectors such as the classic photographic plates and solid-state detector arrays. While this refractive field flattener approach is effective for the types of field curvatures formed in typical lens systems, it is often not capable of correcting the large field curvatures generated in extremely compact or miniaturized optical imaging systems or those generated by many dispersive elements utilized in spectrometer or hyperspectral imaging systems.

Current field flattening and field conversion designs are either limited in their field flattening or field conversion capabilities, are too complex or costly to fabricate, or introduce unwanted optical aberrations.

There is therefore a need for an optical field flattener design that is more compact in physical size than current field flatteners.

Furthermore, there is also a need for an optical field flattener design that is optically faster than current field flatteners.

Furthermore, there is also a need for an optical field flattener design that is capable of correcting larger amounts of field curvature than current field flatteners.

Furthermore, there is also a need for an optical field flattener design that is self-corrected for optical aberrations.

Still further, there is also a need for an optical field flattener design that provides a combination of the characteristics described above with superior trade-offs than have been previously attainable.

BRIEF SUMMARY OF THE INVENTION

The needs set forth above as well as further and other needs and advantages of the present invention are achieved by the embodiments of the invention described herein below.

In one embodiment, the optical system of this invention includes a number of gradient index rod lenses arranged in an array, where in the array, each gradient index rod lens is substantially in proximity with at least one other gradient index rod lens. The array is capable of receiving electromagnetic radiation from a source and of imaging the received electromagnetic radiation onto an image surface. The gradient index rod lenses are selected in order to image the received electromagnetic radiation onto a focal locus of said image surface and at least one surface of said array is a non-planar surface.

In one instance, a surface of the array that is closest to the source is a non-planar surface. In another instance, a surface of the array that is closest to the image surface is a non-planar surface.

For a better understanding of the present invention, together with other and further objects thereof, reference is made to the accompanying drawings and detailed description and its scope will be pointed out in the appended claims.

DETAILED DESCRIPTION OF THE INVENTION

In one embodiment, gradient index rod lens arrays are utilized to form high performance field flatteners and field converters. The term GRAFF is an acronym for Gradient Rod Array Field Flattener and is used to describe systems such as the systems of this invention. The GRAFF utilizes gradient index rod lenses to re-image local spatial sub-fields from one focal locus to another. Gradient index rod lenses, similar to gradient index optical fibers, are dielectric cylinders with a predetermined variation, parabolic or similar radial variation in one embodiment, of refractive index that causes the incident light to propagate in sinusoidal or other nonlinear trajectories within the element. The length of each rod lens in the array is selected such that the corresponding sub-field of one focal locus is re-imaged to the corresponding local sub-field of another, and in many configurations, each sub-field may be imaged by multiple rod lenses in the array. In this manner, a focal locus of one curvature can be re-imaged piecewise to a focal locus of another curvature, where these curvatures can vary from planar surfaces to significantly large sections of a spherical, aspherical, or other non-planar surface. The width of the rod lenses can be varied from a fraction of a millimeter to several millimeters, as required to keep the small local field sag within the depth of focus of the rod lens, and the array itself can be coupled with additional refracting elements to reduce residual optical aberrations and increase the performance of the device.

This invention introduces another degree of freedom in the design of tightly constrained and complex high performance optical systems. In the design of such systems, degrees of freedom are utilized to meet fixed system performance requirements, and can typically only be introduced or expanded at the cost of increased complexity. For example, additional elements or exotic materials can be introduced into a multi-element system to correct chromatic aberrations. One of these fixed system requirements is typically a flat image or dispersion field. The ability to allow the curvature of the image or dispersion field to float as an unconstrained parameter releases degrees of freedom for increasing system performance in other ways. The invention disclosed herein can be used to relay the resulting curved image field onto a planar detecting element or other non-planar image surfaces without introducing additional optical aberrations.

Figure 1:
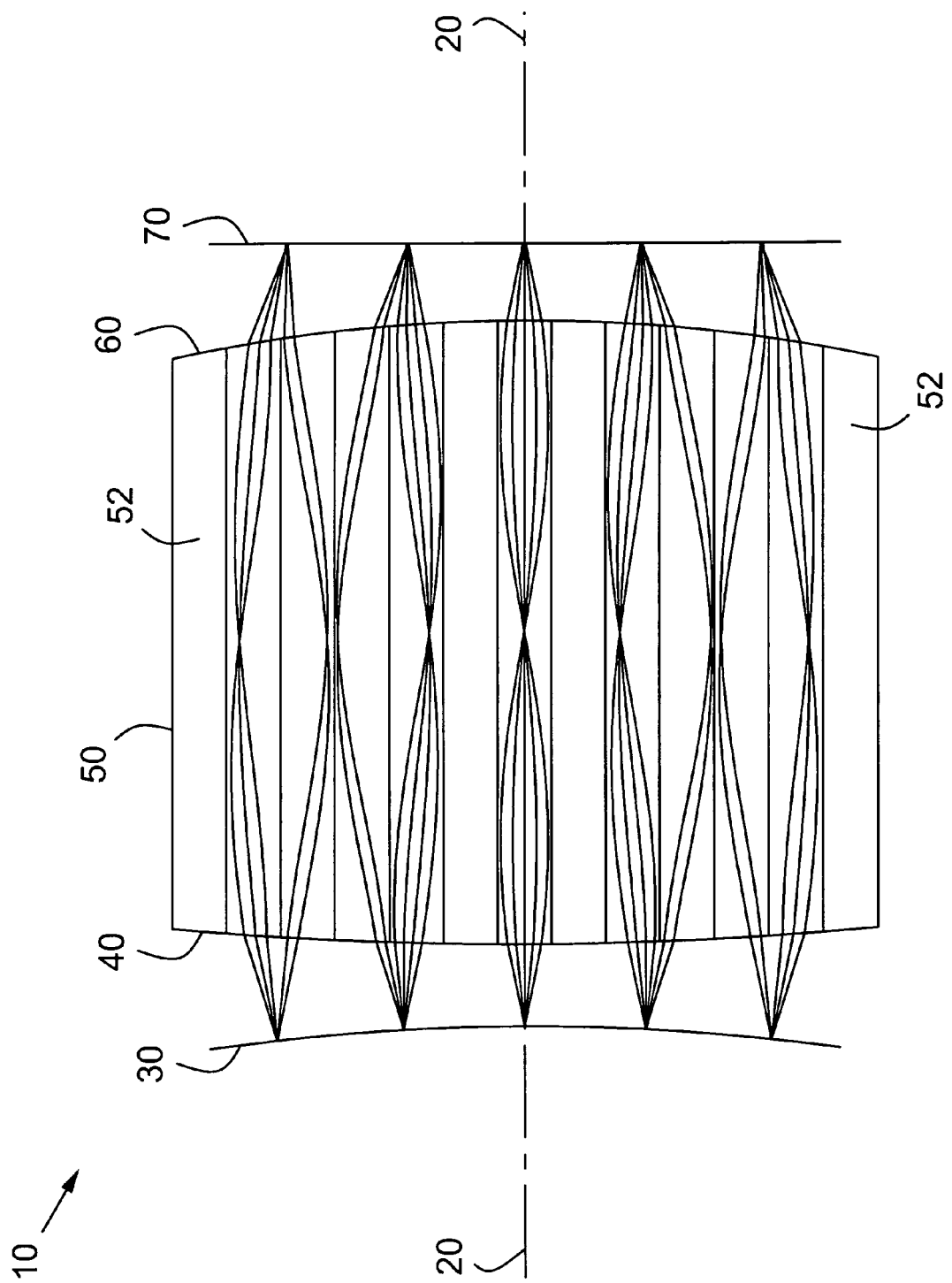
FIG. 1 is a schematic sectional view of a gradient index field flattener in accordance with an embodiment of the present invention, taken along the optical axis.

Reference is made to FIG. 1, which is a schematic sectional view of an embodiment of this invention 10, taken along the optical axis 20. In operation, electromagnetic radiation, typically in the ultraviolet, visible, and/or infrared bands, hereinafter referred to generally as light, emitted or reflected by a given object, either real or virtual, located along a non-planar object locus 30, is imaged by an array of radial gradient index rods 50, consisting of multiple radial gradient index rods 52, and having curved front and back surfaces 40 and 60 respectively, onto a CCD array, phosphorescent screen, photographic film, microbolometer array, or other means of detecting light energy, hereinafter referred to generally as a detecting element 70.

The surface curvatures 40 and 60 provide variable object to gradient index rod separation, gradient index rod length, and gradient index rod to image separation distances as a function of spatial field position. These variations combine to provide variable object to image conjugate distances as a function of spatial field position that are used to re-image the non-planar object locus 30 to the planar image locus 70, thereby flattening the original object field. These curved surfaces 40 and 60 also introduce a degree of optical aberrations that can limit the optical speed and imaging quality of the device.

Figure 2A:
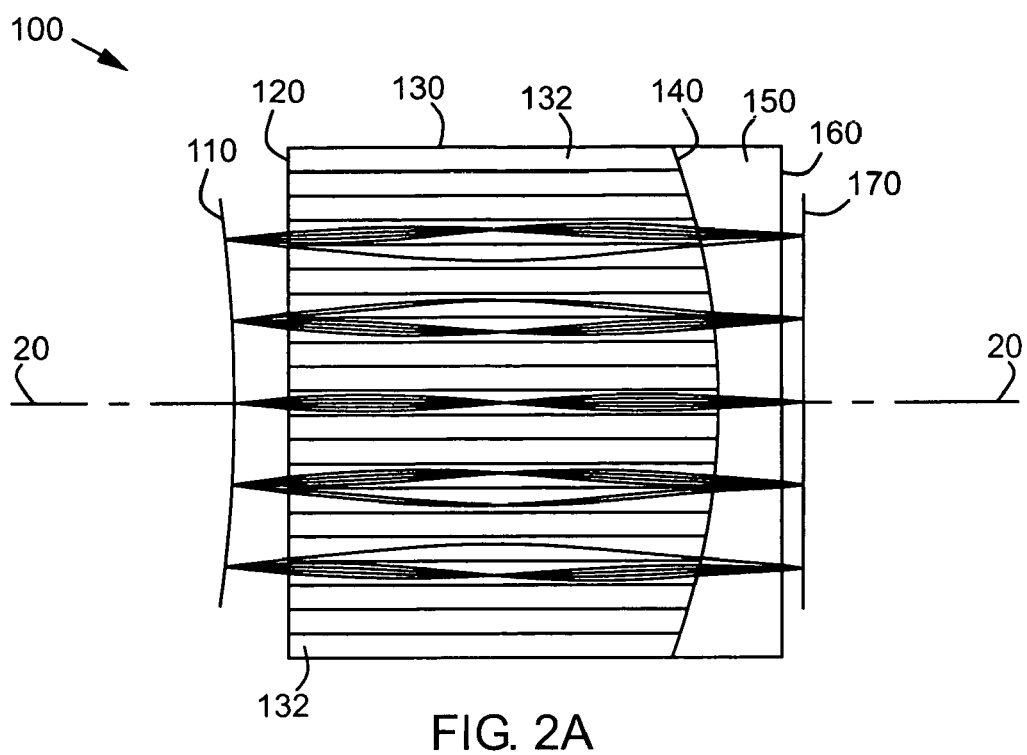
FIG. 2A is a schematic sectional view of a gradient index field flattener in accordance with a further embodiment of the present invention, taken along the optical axis.

Reference is made to FIG. 2A, which is a schematic sectional view of a further embodiment of this invention 100, taken along the optical axis 20. In operation, light located along a non-planar object locus 110, is imaged through an array of radial gradient index rods 130, consisting of multiple radial gradient index rods 132, and having a substantially planar front surface 120 and curved back surface 140. The light then propagates through a refractive element 150, which is in contact with the gradient index rod array 130, with a curved front surface 140, which is coincident with the back surface of the gradient index rod array 130, and a substantially planar back surface 160, onto a detecting element 170. The substantially planar surfaces 120 and 160 reduce the optical aberrations of the system, while the curved contact surface 140 provides the variable object to gradient index rod separation, gradient index rod length, and gradient index rod to image separation distances as a function of spatial field position required to flatten the field.

Figure 2B:
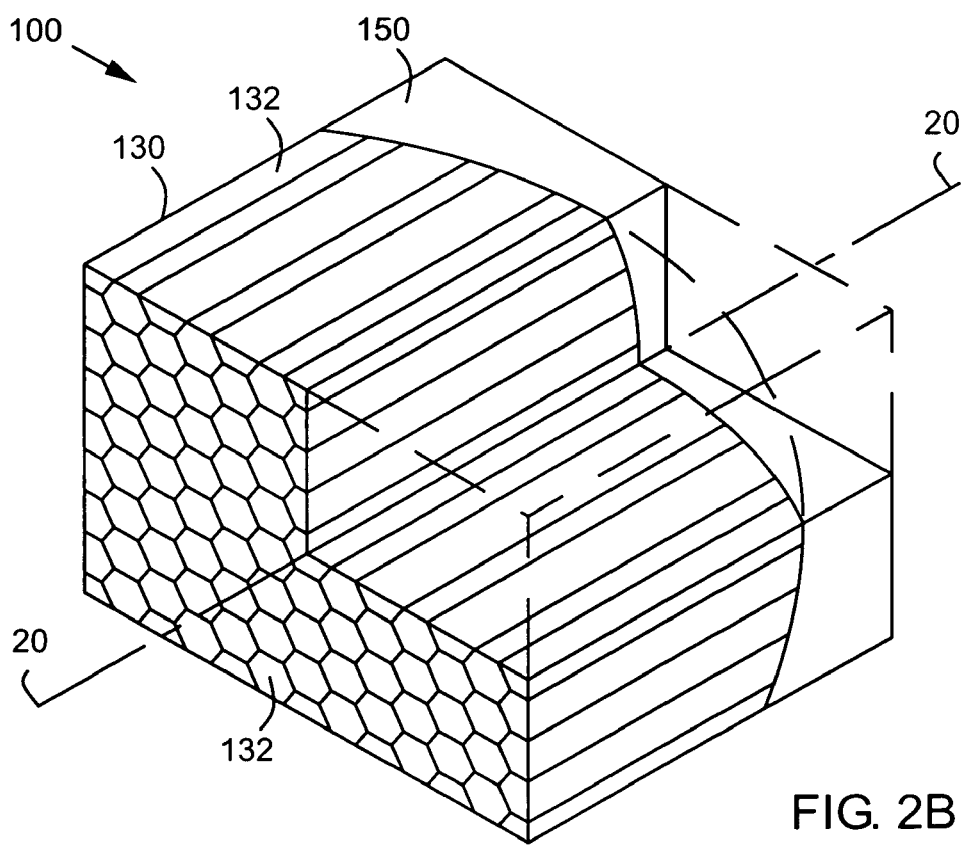
FIG. 2B is an isometric view of the embodiment of the present invention illustrated in FIG. 2A.

Reference is made to FIG. 2B, which is an isometric view of this same embodiment 100. The gradient index rods 132 that comprise the gradient index rod array 130 are arranged in a packing configuration, the preferred embodiment of which is a hexagonally packed array, to provide the required degree of spatial field coverage. The gradient index rod array 130 and refracting element 150 are typically combined to form a cemented doublet configuration.

It should be realized that a non-refractive or diffractive optical element may also be used in place of the refractive element 150 of embodiment 100.

Figure 3A:
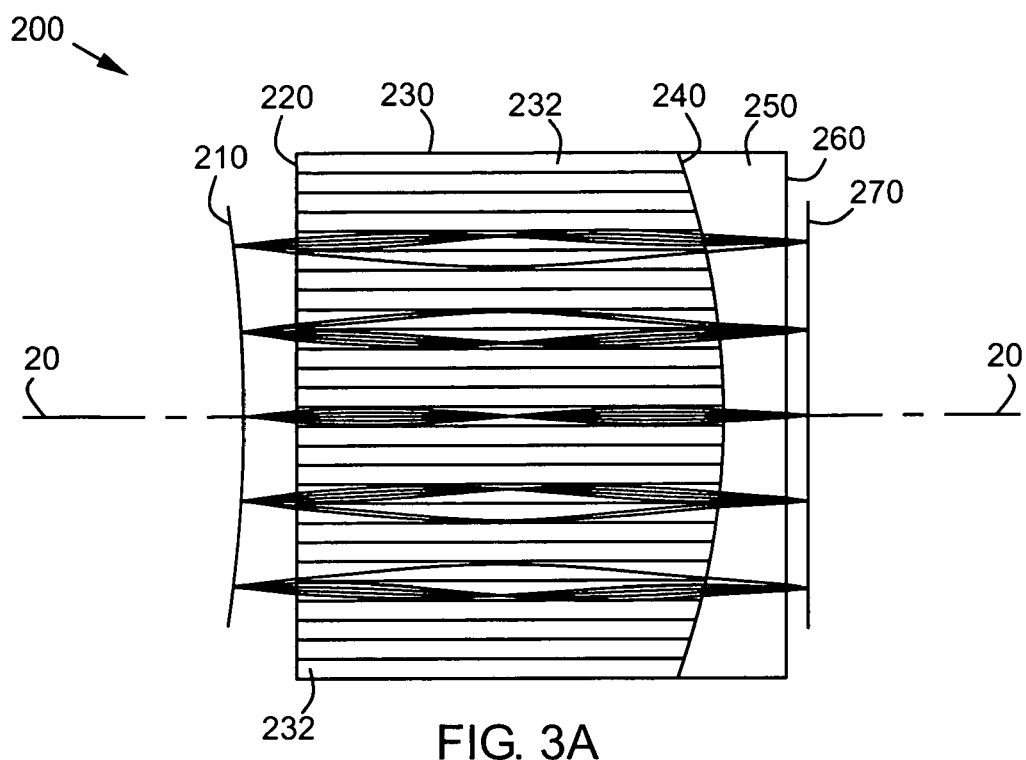
FIG. 3A is a schematic sectional view of a gradient index field flattener in accordance with a further embodiment of the present invention, taken along the optical axis.

Reference is made to FIG. 3A, which is a schematic sectional view of a further embodiment of this invention 200, taken along the optical axis 20. In operation, light located along a non-planar object locus 210, is imaged through an array of radial gradient index rods 230, consisting of multiple radial gradient index rods 232, and having a substantially planar front surface 220 and curved back surface 240. The light then propagates through a refractive element 250, which is in contact with the gradient index rod array 230, with a curved front surface 240, which is coincident with the back surface of the gradient index rod array 230, and a substantially planar back surface 260, onto a detecting element 270. The substantially planar surfaces 220 and 260 reduce the optical aberrations of the system, while the curved contact surface 240 provides the variable object to gradient index rod separation, gradient index rod length, and gradient index rod to image separation distances as a function of spatial field position required to flatten the field.

Figure 3B:
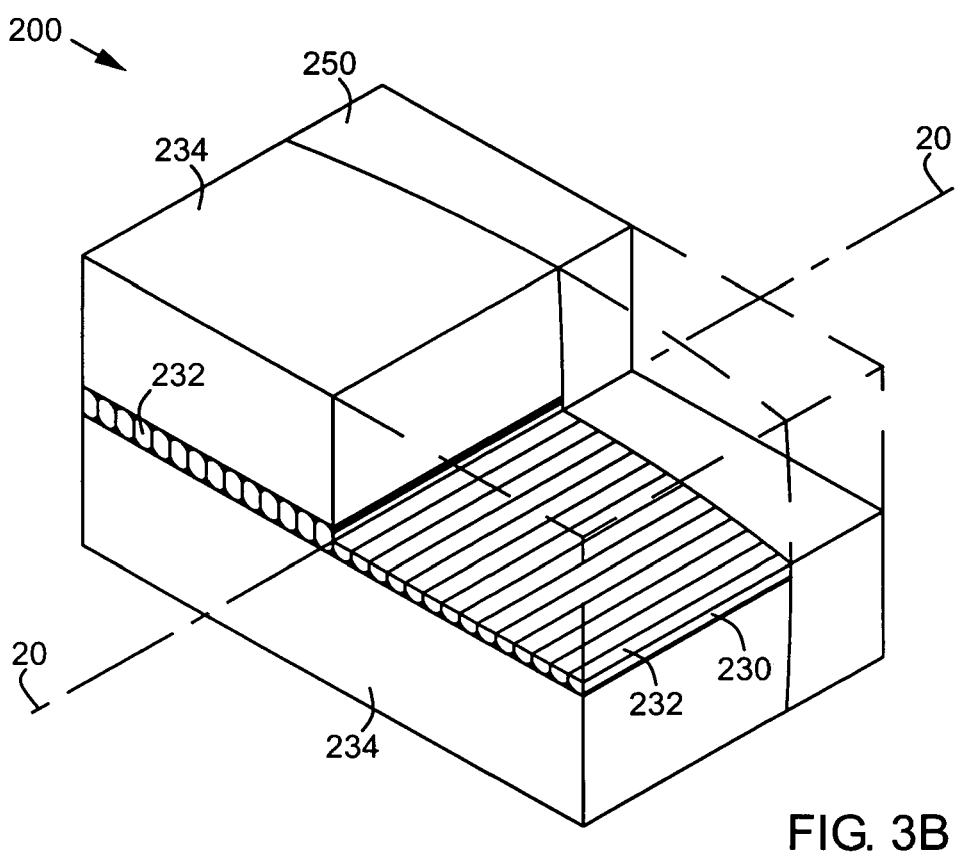
FIG. 3B is an isometric view of the embodiment of the present invention illustrated in FIG. 5A.

Reference is made to FIG. 3B, which is an isometric view of this same embodiment 200. The gradient index rods 232 that comprise the gradient index rod array 230 are arranged in a packing configuration, the preferred embodiment of which is a linearly packed array cemented between two structural substrates 234, to provide the required degree of spatial field coverage, the preferred embodiment of which is a narrow slit field suitable for line imaging systems. The gradient index rod array 230 and structural substrates 234 are typically combined as a single element that is in turn combined with refracting element 250 to form a cemented doublet configuration.

Figure 4:
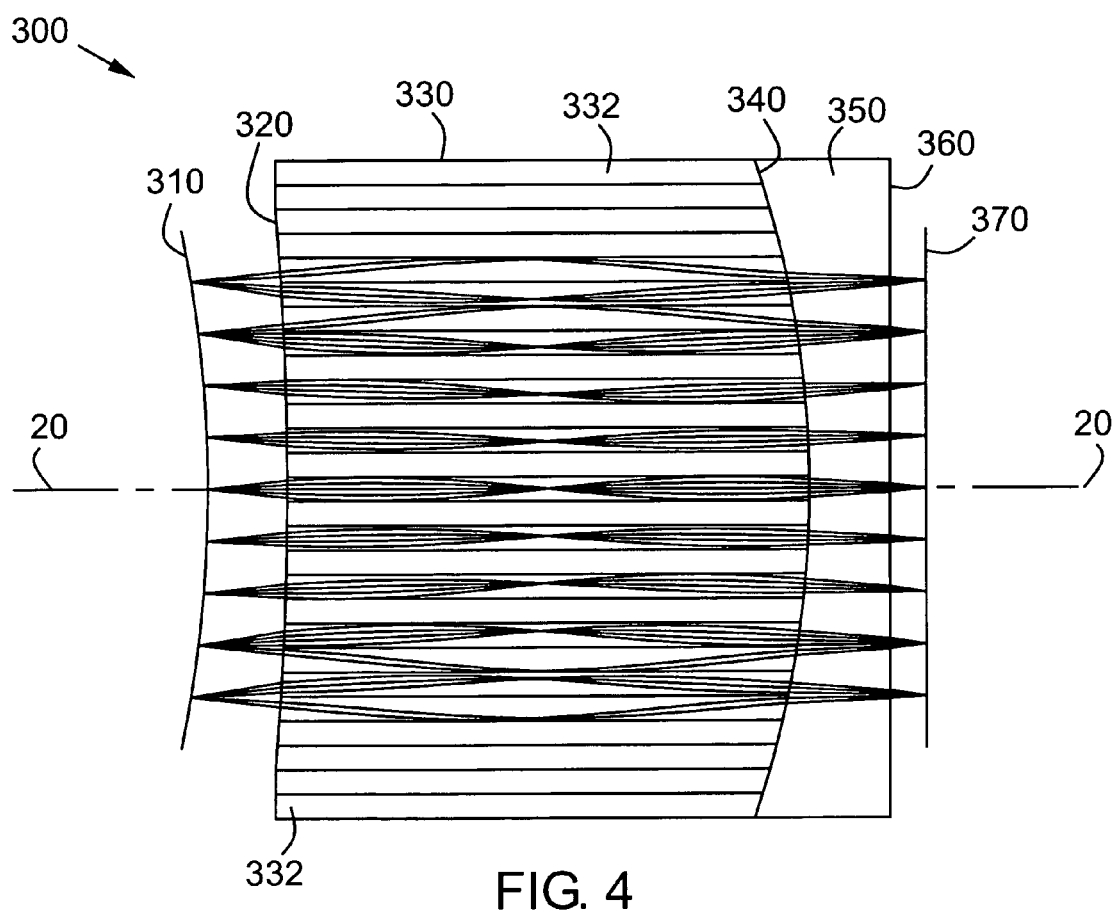
FIG. 4 is a schematic sectional view of a gradient index field flattener in accordance with a further embodiment of the present invention, taken along the optical axis.

A greater degree of field curvature correction can be attained by introducing some degree of curvature to one or more of the substantially planar surfaces. Reference is made to FIG. 4, which is a schematic sectional view of a further embodiment of this invention 300, taken along the optical axis 20. In operation, light located along a non-planar object locus 310, is imaged through an array of radial gradient index rods 330, consisting of multiple radial gradient index rods 332, and having a curved front and back surfaces 320 and 340 respectively. The light then propagates through a refractive element 350, which is in contact with the gradient index rod array 330, with a curved front surface 340, which is coincident with the back surface of the gradient index rod array 330, and a substantially planar back surface 360, onto a detecting element 370. The slight curvature of surface 320 provides a greater degree of field curvature correction without introducing significant optical aberrations of the system.

Figure 5:
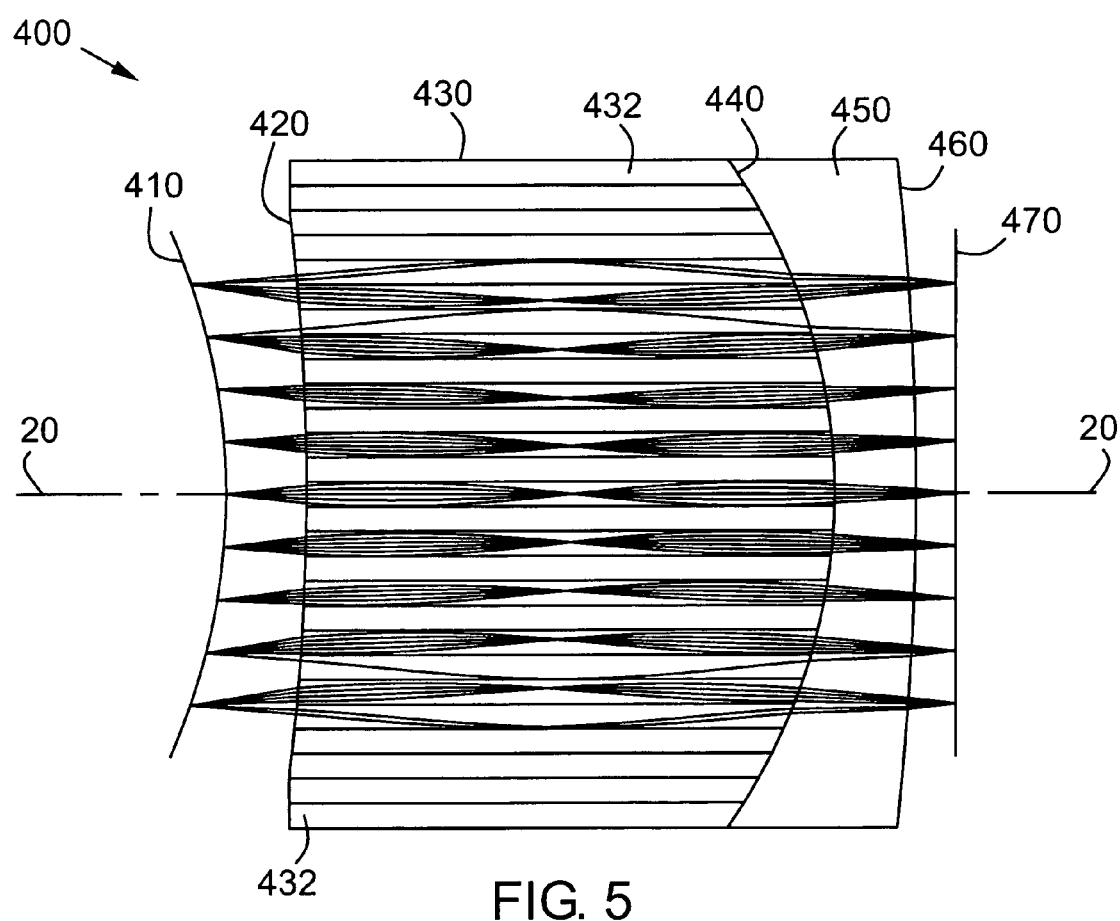
FIG. 5 is a schematic sectional view of a gradient index field flattener in accordance with a further embodiment of the present invention, taken along the optical axis.

A still greater degree of field curvature correction can be attained by introducing some degree of curvature to all surfaces. Reference is made to FIG. 5, which is a schematic sectional view of a further embodiment of this invention 400, taken along the optical axis 20. In operation, light located along a non-planar object locus 410, is imaged through an array of radial gradient index rods 430, consisting of multiple radial gradient index rods 432, and having a curved front and back surfaces 420 and 440 respectively. The light then propagates through a refractive element 450, which is in contact with the gradient index rod array 430, with a curved front surface 440, which is coincident with the back surface of the gradient index rod array 430, and a curved back surface 460, onto a detecting element 470. The curvatures of surfaces 420 and 460 provide a still greater degree of field curvature correction, which is balanced against the optical aberrations that are introduced to the system.

Figure 6A:
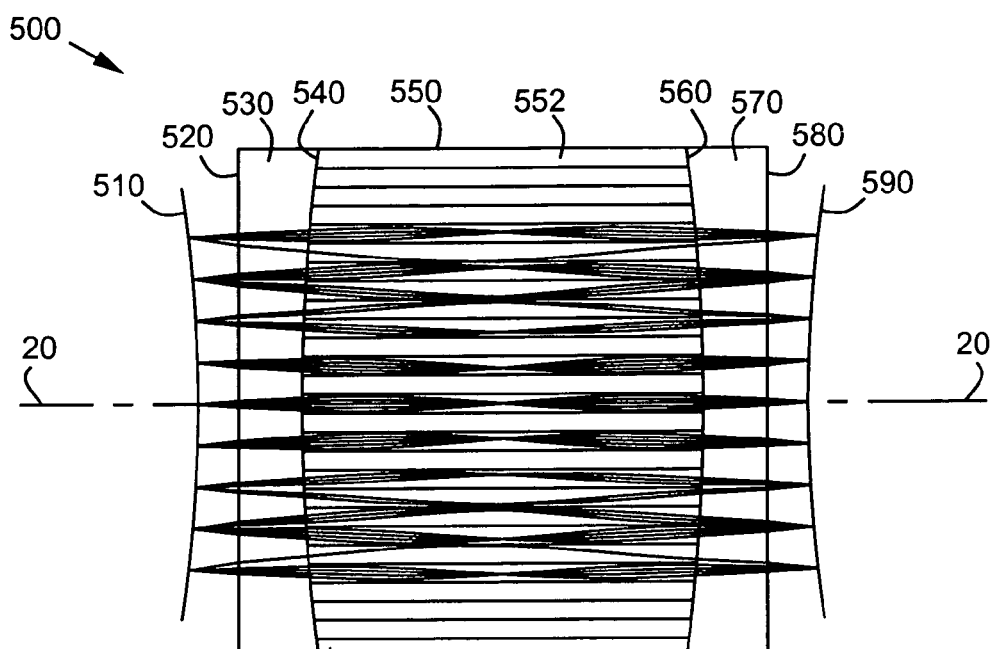
FIG. 6A is a schematic sectional view of a gradient index field flattener in accordance with a further embodiment of the present invention, taken along the optical axis.

Reference is made to FIG. 6A, which is a schematic sectional view of a further embodiment of this invention 500, taken along the optical axis 20. In operation, light located along a non-planar object locus 510, propagates through a first refractive element 530, having a substantially planar or curved front surface 520 and curved back surface 540. The light is then imaged through an array of radial gradient index rods 550, consisting of multiple radial gradient index rods 552, with a curved front surface 540, which is coincident with the back surface of the first refractive element 530, and a curved back surface 560. The light then propagates through a second refractive element 570, which is in contact with the gradient index rod array 550, with a curved front surface 560, which is coincident with the back surface of the gradient index rod array 550, and a planar or curved back surface 580, onto a detecting element or image field 590. The curved contact surfaces 540 and 560 provide the variable object to gradient index rod separation, gradient index rod length, and gradient index rod to image separation distances as a function of spatial field position required to convert the curved object field 510 to the desired curved image field 590. The planar or curved surfaces 520 and 580 can be optimized to correct the optical aberrations of the system.

Figure 6B:
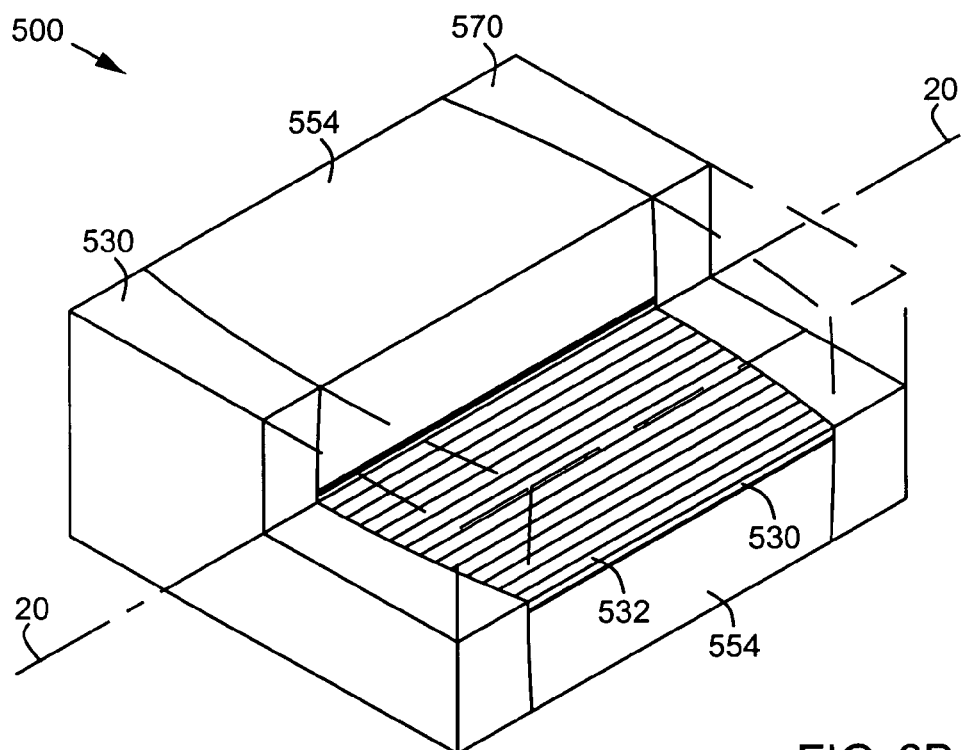
FIG. 6B is an isometric view of the embodiment of the present invention illustrated in FIG. 6A.

Reference is made to FIG. 6B, which is an isometric view of this same embodiment 500. The gradient index rods 552 that comprise the gradient index rod array 550 are arranged in a packing configuration, the preferred embodiment of which is a linearly packed array cemented between two structural substrates 554, to provide the required degree of spatial field coverage, the preferred embodiment of which is a narrow slit field suitable for line imaging systems. The gradient index rod array 550 and structural substrates 554 are typically combined as a single element that is in turn combined with refracting elements 530 and 570 to form a cemented triplet configuration.

It should be realized that a non-refractive or diffractive optical element may also be used in place of the refractive element 530 of embodiment 500.

Figure 7:
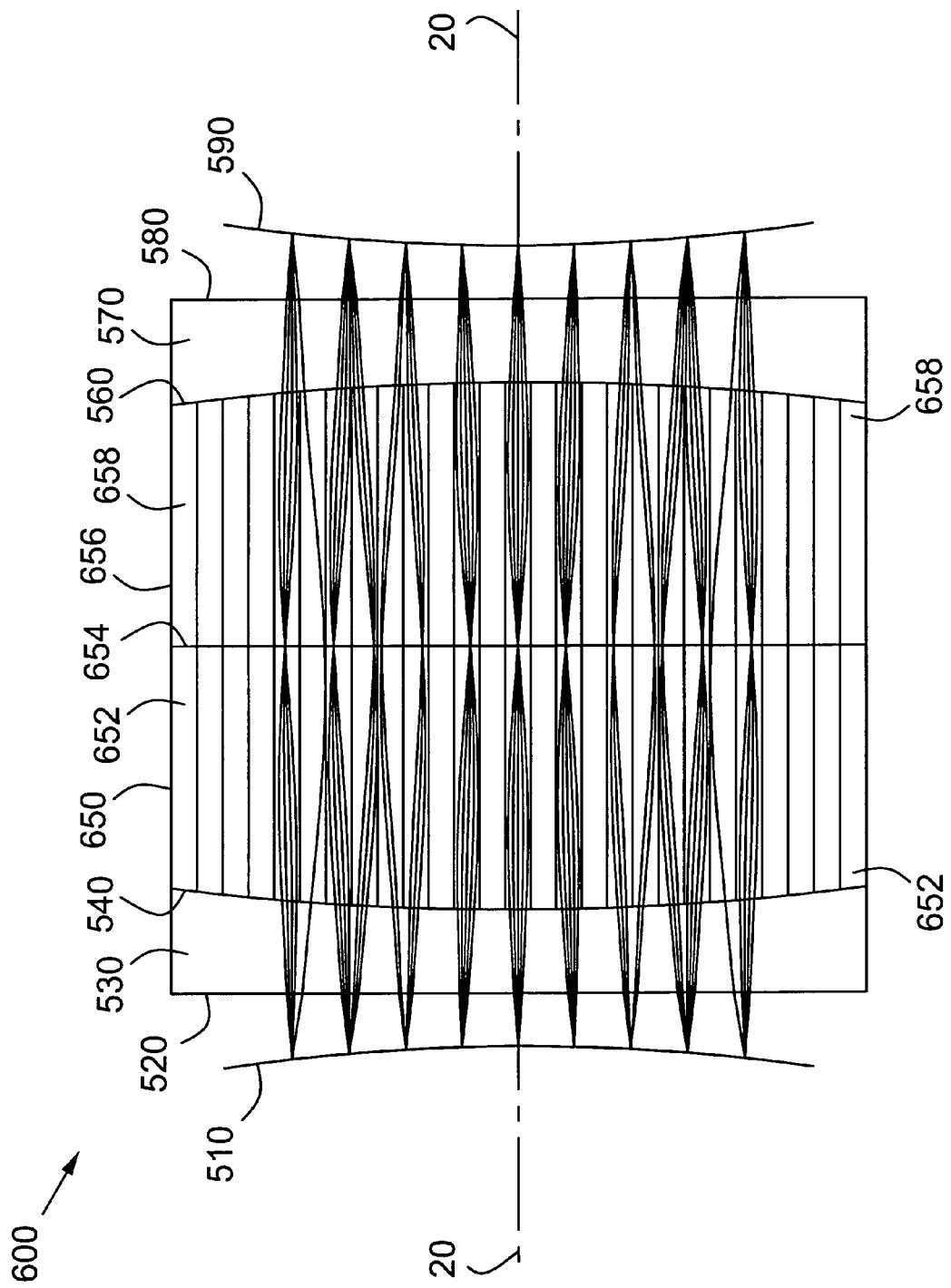
FIG. 7 is a schematic sectional view of a gradient index field flattener in accordance with a still further embodiment of the present invention, taken along the optical axis.

Reference is made to FIG. 7, which is a schematic sectional view of a still further embodiment of this invention 600, taken along the optical axis 20, and illustrates a modification of the embodiment 500 where a slit or other method of extracting a line image, hereinafter referred to generally as a slit element 654, is located at an intermediate image locus located within the unmodified gradient index rod array 550. In operation, light located along a non-planar object locus 510, propagates through a first refractive element 530, having a substantially planar or curved front surface 520 and curved back surface 540. The light is then imaged through a first array of radial gradient index rods 650, consisting of multiple radial gradient index rods 652, with a curved front surface 540, which is coincident with the back surface of the first refractive element 530, onto a slit element 654. The light is then imaged through a second array of radial gradient index rods 656, consisting of multiple radial gradient index rods 658, with a curved back surface 560. The light then propagates through a second refractive element 570, which is in contact with the second gradient index rod array 656, with a curved front surface 560, which is coincident with the back surface of the second gradient index rod array 550, and a substantially planar or curved back surface 580, onto a detecting element or image field 590. The curved contact surfaces 540 and 560 provide the variable object to gradient index rod separation, gradient index rod length, and gradient index rod to image separation distances as a function of spatial field position required to convert the curved object field 510 to the desired curved image field 590. The substantially planar or curved surfaces 520 and 580 can be optimized to correct the optical aberrations of the system. The light imaged at the slit element 654 may be multiple in occurrence due to the possibility of multiple imaging paths through the first array of gradient index rods 650. These multiple images, however, remain within the same plane along which the slit element 654 is oriented. The second array of gradient index rods 656 recombines these multiple images at the detecting element or image field 590.

It should be realized that any aperture shape may be used in place of the slit element 654 of embodiment 600. It should further be realized that any optical element, including a diffractive element such as a grating, may be used in place of the slit element 654 of embodiment 600.

Although the invention has been described with respect to various embodiments, it should be realized this invention is also capable of a wide variety of further and other embodiments within the spirit and scope of the appended claims.

What is claimed is:

1. An optical system comprising:
a plurality of gradient index rod lenses arranged in an array;
in said array, each gradient index rod lens from said plurality of gradient index rod lenses is substantially in proximity with at least one other gradient index rod lens from said plurality of gradient index rod lenses;
said array being capable of receiving electromagnetic radiation from a source and of imaging the received electromagnetic radiation onto an image surface;
said gradient index rod lenses being selected in order to image the received electromagnetic radiation onto a focal locus of said image surface;

said gradient index rod lenses being selected such that a first curvature of a focal locus of a source surface is imaged to a focal locus of second curvature; at least one curvature from said first curvature and said second curvature being non-planar;
at least one surface of said array being a non-planar surface.

2. The optical system of claim 1 wherein a surface of said array that is closest to the source is a non-planar surface.

3. The optical system of claim 1 wherein a surface of said array that is closest to the source is a substantially flat surface.

4. An optical system comprising:
a plurality of gradient index rod lenses arranged in an array;
in said array, each gradient index rod lens from said plurality of gradient index rod lenses is substantially in proximity with at least one other gradient index rod lens from said plurality of gradient index rod lenses;
said array being capable of receiving electromagnetic radiation from a source and of imaging the received electromagnetic radiation onto an image surface;
said gradient index rod lenses being selected in order to image the received electromagnetic radiation onto a focal locus of said image surface;
at least one surface of said array being a non-planar surface;
an optical element optically disposed between said array and the image surface;
a front surface of said optical element being substantially congruent to and disposed on the surface of said array that is closest to the image surface;
the front surface of said optical element being capable of receiving electromagnetic radiation from said array;
said optical element being capable of transmitting the electromagnetic radiation from said array to said image surface.

5. The optical system of claim 4 wherein said optical element is a refractive element.

6. The optical system of claim 4 wherein a surface of said optical element that is closest to the image surface is a non-planar surface.

7. The optical system of claim 4 wherein a surface of said optical element that is closest to the image surface is a substantially flat surface.

8. The optical system of claim 4 further comprising:
another optical element optically disposed between the source and said array;
a back surface of said another optical element being substantially congruent to and disposed on a surface of said array that is closest to the source;
a front surface of said another optical element being capable of receiving the electromagnetic radiation from the source;
said another optical element being capable of transmitting the electromagnetic radiation from the source to said array.

9. The optical system of claim 8 wherein said another optical element is a refractive element.

10. The optical system of claim 8 wherein the front surface of said another optical element is a non-planar surface.

11. The optical system of claim 8 wherein the front surface of said another optical element is a substantially flat surface.

12. The optical system of claim 1 wherein said array comprises a geometric pattern of gradient index rod lenses.

13. The optical system of claim 12 wherein said array comprises a hexagonally packed array.

14. The optical system of claim 12 wherein said array comprises a linearly packed array.

15. A field curvature conversion device comprising:
a first array of gradient index rod lenses;
said first array comprising a first plurality of gradient index rod lenses;
in said first array, each gradient index rod lens from said first plurality of gradient index rod lenses is substantially in contact with at least one other gradient index rod lens from said first plurality of gradient index rod lenses;
said first array being capable of receiving electromagnetic radiation from a source and of imaging the received electromagnetic radiation onto an intermediate image surface;
an optical element located at substantially an intermediate image surface; and,
a second array of gradient index rod lenses;
said second array comprising a second plurality of gradient index rod lenses;
in said second array, each gradient index rod lens from said second plurality of gradient index rod lenses is substantially in contact with at least one other gradient index rod lens from said second plurality of gradient index rod lenses;
said second array being capable of receiving electromagnetic radiation emanating from said slit element and of imaging the electromagnetic radiation emanating from said slit element onto an image surface.

16. The field curvature conversion device of claim 15 wherein said optical element comprises an aperture element.

17. The field curvature conversion device of claim 16 wherein said aperture element comprises a slit element.

18. The field curvature conversion device of claim 15 wherein a surface of said first array that is closest to the source is a non-planar surface.

19. The field curvature conversion device of claim 15 wherein a surface of said first array that is closest to the source is a substantially flat surface.

20. The field curvature conversion device of claim 15 wherein a surface of said second array that is closest to the image surface is a non-planar surface.

21. The field curvature conversion device of claim 15 wherein a surface of said second array that is closest to the image surface is a substantially flat surface.

22. The field curvature conversion device of claim 15 further comprising:
an optical element optically disposed between said second array and the image surface;
a front surface of said optical element being substantially congruent to and disposed on the surface of said second array that is closest to the image surface;
the front surface of said optical element being capable of receiving electromagnetic radiation from said second array and of imaging the received electromagnetic radiation onto the image surface.

23. The field curvature conversion device of claim 22 wherein said optical element is a refractive element.

24. The field curvature conversion device of claim 22 wherein a surface of said optical element that is closest to the image surface is a non-planar surface.

25. The field curvature conversion device of claim 22 wherein a surface of said optical element that is closest to the image surface is a substantially flat surface.

26. The field curvature conversion device of claim 22 further comprising:
   another optical element optically disposed between the source and said first array;
   a back surface of said another optical element being substantially congruent to and disposed on a surface of said first array that is closest to the source;
   a front surface of said another optical element being capable of receiving the electromagnetic radiation from the source;
      said another optical element being capable of transmitting the electromagnetic radiation from the source to said first array.

27. The field curvature conversion device of claim 26 wherein said another optical element is a refractive element.

28. The field curvature correction device of claim 26 wherein a surface of said another optical element that is closest to the source is a non-planar surface.

29. The field curvature correction device of claim 28 wherein a surface of said another optical element that is closest to the source is a substantially flat surface.

30. The field curvature conversion device of claim 15 wherein said first array of gradient index rod lenses and said second array of gradient index rod lenses being selected such that a first curvature of a focal locus of a source surface is imaged to a focal locus of the image surface of a second curvature; at least one curvature from said first curvature and said second curvature being non-planar.

* * * * *